(12) United States Patent
Lee et al.

(10) Patent No.: US 8,871,872 B2
(45) Date of Patent: Oct. 28, 2014

(54) METHOD FOR PREPARING A DIFUNCTIONAL POLY(GAP-CO-THF)DIOL FOR PREPARATION OF POLYURETHANE HAVING EXCELLENT MECHANICAL PROPERTIES

(71) Applicant: Agency For Defense Development, Daejeon (KR)

(72) Inventors: Bum Jae Lee, Daejeon (KR); In Joo Bae, Daejeon (KR); Jin Seuk Kim, Daejeon (KR); Seung Hee Kim, Daejeon (KR)

(73) Assignee: Agency For Defense Development, Daejeon (KR)

( * ) Notice: Subject to any disclaimer, the term of this patent is extended or adjusted under 35 U.S.C. 154(b) by 0 days.

(21) Appl. No.: 13/894,962

(22) Filed: May 15, 2013

(65) Prior Publication Data

US 2014/0135453 A1    May 15, 2014

(30) Foreign Application Priority Data

May 16, 2012    (KR) .................. 10-2012-0052017

(51) Int. Cl.
  *C08G 63/91*    (2006.01)
  *C08G 65/325*    (2006.01)
  *C08G 65/32*    (2006.01)
(52) U.S. Cl.
  CPC .................................. *C08G 65/325* (2013.01)
  USPC ........................... 525/410; 525/402; 525/407
(58) Field of Classification Search
  USPC ......................................... 525/402, 407, 410
  See application file for complete search history.

(56) References Cited

U.S. PATENT DOCUMENTS 3,576,906 A * 4/1971 Hickner et al. ................ 525/406
4,882,395 A   11/1989 Ahad
5,093,386 A * 3/1992 Bishop et al. ................... 522/96

OTHER PUBLICATIONS

Agrawal, "Recent Trends in High-Energy Materials", 1998, pp. 1-30.
Provatas, "Energetic Polymers and Plasticisers for Explosive Formulations—A Review of Recent Advances", 2000.
Kubota, "Combustion Mechanism of Azide Polymer", 1988, pp. 172-177.
Manser et al., "High Energy Binders", Jan. 1984.
Desai et al., "Synthesis of narrow molecular weight α,ω-hydroxy telechelic poly(glycidyl nitrate) and estimation of theoretical heat of explosion", 1996, pp. 3471-3476.
Frankel et al., "Historical Development of Glycidyl Azide Polymer", 1992.
Selim et al., "Thermal Characterization of Glycidyl Azide Polymer (GAP) and GAP-Based Binders for Composite Propellants", 2000, pp. 538-546.
Mohan et al., "Synthesis and Characterization of GAP-THF Copolymers", 2006, pp. 203-217.
Gaur et al., "Azido Polymers—Energetic Binders for Solid Rocket Propellants", 2003, pp. 505-545.

* cited by examiner

*Primary Examiner* — Terressa Boykin
(74) *Attorney, Agent, or Firm* — Harness, Dickey & Pierce, P.L.C.

(57) ABSTRACT

Provided is a method for a poly(GAP-co-THF)diol prepolymer in which THF monomer units are copolymerized to GAP, having high difunctionality, a reduced amount of cyclic oligomer side products having a small molecular weight, a wide copolymer composition and controlled molecular weight. The resulted poly(GAP-co-THF)diol prepolymer according to the present invention is used as a binder for a high-energy PBX or composite propellant, specifically used as a binder in the preparation of polyurethane having excellent mechanical properties.

2 Claims, 5 Drawing Sheets

METHOD FOR PREPARING A DIFUNCTIONAL POLY(GAP-CO-THF)DIOL FOR PREPARATION OF POLYURETHANE HAVING EXCELLENT MECHANICAL PROPERTIES

CROSS-REFERENCE TO RELATED APPLICATION

This application claims the benefit and priority of Korean Patent Application No. 10-2012-0052017 filed May 16, 2012. The entire disclosure of the above application is incorporated herein by reference.

TECHNICAL FIELD

The present invention relates to a method for preparing a difunctional poly(glycidylazyido polymer-co-tetrahydrofuran)diol (hereinafter, poly(GAP-co-THF)diol) prepolymer used for the preparation of a binder for PBX or composite propellant, specifically to a method for preparing a difunctional poly(GAP-co-THF)diol prepolymer, which can make significant improvement in the mechanical properties including elasticity, elongation and toughness of the resulting polyurethane, by using $BF_3$.THF as a cationic catalyst in a cationic ring-opening polymerization between ethylene oxide and THF and comprising a re-precipitation step after an azidation reaction.

BACKGROUND ART

Both PBX and a composite propellant are high filled composite materials which are mainly comprised of explosive particles and polymer materials.

Ever since the development of PBX on 1960, as for a binder for a composite propellant and PBX, inert binders such as polyesters, epoxide, polysulfide or polyurethane binders have been majorly used. Currently, hydroxyl-terminated polybutadiene (HTPB) has been reported to be a binder having the most excellent performance.

Although conventional polymer binders are insensitive, they are non-energetic, therefore it has been raised as a problem that the reduction in the whole energy density of the high performance PBX of which demand is increasing. Since PBX is generally prepared by homogeneously mixing solid molecular explosive particles and a binder and casting the mixture, there are many limitations in the preparation of high performance PBX or propellants which use a high energy oxidizing agent due to problems such as compatibility between two components. Further, high performance explosives or high performance propellants have high sensitivity of the final explosive product, being potentially dangerous. In this regard, in order to prepare explosives having low sensitivity as well as high performance, a method to adjust to reduce the degree of filling with solid explosives by using a high energy binder has been recently proposed.

In recent years, with an effort to achieve high performance PBXs and improved performance in composite propellants, many studies regarding a high energy binder and a high energy plasticizer which contain high energy functional groups such as GAP, poly(3-nitratomethyl-3-methyl-ocetane) (hereinafter, poly(NIMMO)) and poly(glycidyl nitrate) (hereinafter, poly(GLYN)) have been made, and examples showing their applications to some high performance PBXs or complex propellants have been reported.

However, high energy polymer binders such as such GAP, poly(NIMMO) and poly(GLYN) which still have been being studied so far potentially have many problems in terms of thermal stability, compatibility with explosives, processability and mechanical properties.

For the application as a novel high energy binder material, requirements in properties such as high energy and density contained in a unit mass, excellent safety (abrasion sensitivity and impact sensitivity, etc.), heat resistance and time-dependent property changes, a safe preparation process and low cost requirements should be satisfied. Among these requirements, safety properties such as abrasion sensitivity or impact sensitivity, etc. are not easily anticipated on a theoretical basis, which have great effects on putting it to practical use. Compatibility with a high energy density oxidizing agent is also one of the considerable requirements for selection for practical use.

The above-explained high energy binders are prepared through a curing reaction between a prepolymer which is in the form of a high energetic polyol and a curing agent corresponding to the prepolymer, i.e., for example polyfunctional isocyanate. Most of currently used high energy polyols consist of polyether-type backbone chains, which are prepared by a cationic ring-opening polymerization of oxirane or oxetane monomers containing energy groups such as $—N_3$ and $—ONO_2$.

Among the conventional high energetic binders, GAP has high density (1.29 g/mol), great heat of formation (+176 kJ/mol) and emits a large amount of energy during the break of $—N_3$ bindings and then generation of $N_2$ therefrom. Based on such properties, after 1972 when its synthesis have been first reported, from 1980 to the present, it has been one of the most studied high energetic polyols for the use of a high energetic binders. GAP binder is a eco-friendly high energetic material with less chlorinated gas, have good compatibility with most high energy oxidizing agents and insensitive properties. Therefore, GAP has been drawing an attention as a low smoke propellant or a low pollutive compound and its synthesis, structure, thermal behavior, physical/chemical properties are studied extensively.

Among GAPs, those having a typical molecular weight of approximately 1700±300 g/mol are used as a binder, which have a low glass transition temperature (Tg=−45° C.) and excellent thermal stability (Td=200-247° C.). However, a high performance PBX and composite propellant prepared by using GAP as a prepolymer in conventional arts, as described above, have problems in mechanical properties owing to degradation in properties such as elasticity by $—N_3$ substitution groups, and particularly they are reported to have a disadvantage of losing flexibility at a low temperature. Based on such reasons, in practical applications as a binder to explosives and propellants, an excessive amount of a plasticizer 3 to 4 times as much as the amount of polyol is used, which causes migration of the plasticizer and debonding between the explosive or propellant and a liner. Further, gas generation resulted from side reactions between impurities and moisture generated during a hardening process is also an additional problem in terms of processability, and in order to overcome such problem, various catalysts for curing reaction are reported to be under research.

As for studies regarding GAP, synthesis of GAP-THF copolymer by Y. M. Mohan and K. M. Raju has been reported, however it has low difunctionality and any improvement in polyurethane properties by using it has not been reported.

SUMMARY OF THE INVENTION

The present invention relates to a high energetic polyurethane binder which can satisfy high performance and sensitivity required in the new-generation high performance PBX. The present invention also relates to a method for a poly (GAP-co-THF)diol prepolymer in which THF monomer units are copolymerized to GAP, having high difunctionality, a reduced amount of cyclopolymerized side products having a small molecular weight, a wide copolymer composition and controlled molecular weight, thereby further providing a polyurethane binder having excellent mechanical properties.

DETAILED DESCRIPTION OF THE INVENTION

The present invention provides a method for preparing precisely-controlled poly(GAP-co-THF)diol prepolymers used for the preparation of polyurethane having excellent mechanical characteristics as a binder for a PBX or composite propellant, characterized by using an initiator which can maintain the terminal functional groups in the course of the cataionic ring-opening polymerization so as to have high difunctionality, and comprising a purification step of removing side products after polymerization or during the change of functional groups.

Specifically, the method for preparing poly(GAP-co-THF) diol used as a prepolymer in the preparation of a binder for a PBX or composite propellant according to the present invention comprises the following steps i)-ii):
 i) polymerizing poly(ECH-co-THF)diol via cataionic ring-opening polymerization between epichlorohydrin and THF by using $BF_3$.THF as a catalyst at the presence of an initiator; and
 ii) synthesizing poly(GAP-co-THF)diol by substituting Cl on the side chains of the poly(ECH-co-THF)diol polymerized from the above step i) with —$N_3$.

The above-described whole preparation process is represented by the reaction scheme 1 as bellows, wherein 1,4-butandiol is exemplified as an initiator.

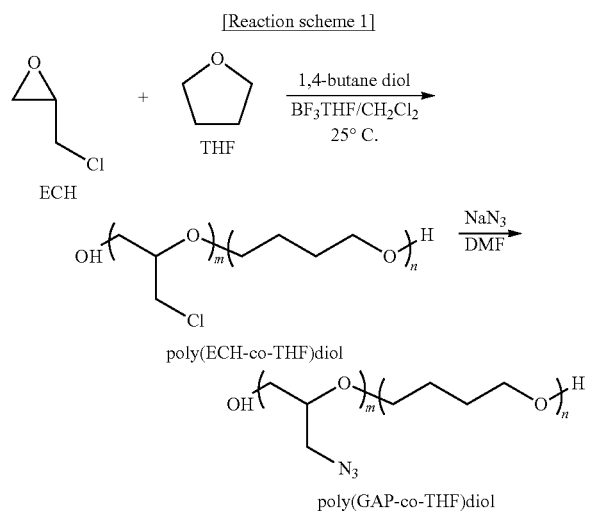

[Reaction scheme 1]

poly(ECH-co-THF)diol poly(GAP-co-THF)diol

The cataionic ring-opening polymerization between ECH and THF of the above step i) according to the present invention is carried out via the activated monomer mechanism (AMM) by applying $BF_3$.THF and slowly adding ECH/THF copolymers dropwise at the presence of an initiator, under the conventional polymerization conditions.

According to the method of present invention, it is possible to eliminate —$OCH_3$ groups present in terminal functional groups at a very small amount, prepare polyols having a low molecular weight distribution and improve difunctionality of the resulting prepolymer, by using $BF_3$.THF, instead of $BF_3$ etherate conventionally used as a positive ion catalyst, and as an initiator, at least one selected from 1,2-ethyleneglycol, 1,3-propanediol, 1,4-butanediol or 1,5-pentanediol.

In the above step ii) according to the present invention, poly(GAP-co-THF)diol copolymers are prepared via azidation of —Cl groups of the side chains of the poly(ECH-co-THF)diol obtained from the above step i), for example by substituting —Cl with —$N_3$, by using $NaN_3$, wherein the azidation reaction may be carried out under conventional azidation conditions, for example at 80-120° C. for 10-15 hours.

After the steps i) and ii), the method according to the present invention may further comprise iii) a purification step via re-precipitation using acetone and methanol. The step iii) is a process for purifying cyclic oligomer side products having a small molecular weight formed during the cataionic ring-opening polymerization process. It is possible to remove impurities by drying at 60° C. under vacuum conditions for one day and additionally at 120° C. under vacuum conditions for about 1 hour. Still additionally, it is possible to further remove cyclic oligomer side products having a small molecular weight comprising cationic initiator and side products by reprecipitation in a mixed solvent of acetone and methanol, thereby obtaining more purified poly(GAP-co-THF)diol copolymers. Although the mixing ratio of acetone to methanol is not specifically limited, for example 1:2 (V/V) may be suitably used.

Thus prepared poly(GAP-co-THF)diol may be further subjected to a reaction with an isocyanate curing agent under conventional reaction conditions so as to prepare polyurethane that is used as a binder for a high performance PBX or composite propellant, and such polyurethane binder has excellent elasticity, elongation and toughness.

Effect of the Invention

By the method of present invention, it is possible to prepare poly(GAP-co-THF)diol having high difunctionality and low cyclic oligomer side products having a small molecular weight used as a prepolymer in the preparation of a polyurethane binder and accordingly to improve mechanical properties of a polyurethane binder material for high performance PBX or composite propellant which has insensitivity and high energy at the same time.

By using the synthesized GAP-THF copolymer-type polyether diol as a prepolymer, it is possible to solve problems of degradation in mechanical properties in a polyurethane binder prepared from the conventional GAP prepolymer, and to reduce the amount of a plasticizer which is excessively used in a conventional PBX composition, thereby significantly reducing the migration of a plasticizer component.

Further, the viscosity of a poly(GAP-co-THF)diol prepolymer is significantly lower than that of a GAP prepolymer, particularly at a low temperature, thereby being advantageously used in the casting process of PBX which has performance and mechanical properties in a wide range. Unlike the conventional GAP generally having a limited molecular weight of 2,000 g/mol or less, which further limits the mechanical properties of a polyurethane binder prepared therefrom disadvantageously, the viscosity of the poly(GAP-co-THF)diol prepolymer prepared according to the present invention does not significantly increase when its molecular weight reaches up to 4,000 g/mol. Therefore, it is possible to broaden the range of physical properties, particularly elongation of the resulted high filled polyurethane. Moreover, the poly(GAP-co-THF)diol prepolymer according to the present invention has high functionality at the end group and makes possible to change the copolymer composition of GAP and THF, thereby embodying the development of high filled PBX over a wide range of energy level or an high filled composite propellant composition having excellent mechanical properties.

Additionally, it is advantageous in physical properties at a lower temperature, since Tg of poly(GAP-co-THF)diol is −49° C. or less. Since it is possible to change the energy or polarity of the GAP-THF copolymer-type polyether diol of the present invention by adjusting the copolymer composition, its compatibility with various oxidizing agents or molecular explosives may be easily modulated. Further, the —$N_3$ groups in the side chain may be utilized as an active site to which molecular explosives are attached via an azide-alkyne click reaction.

PREFERRED EMBODIMENT OF THE INVENTION

Preparation Example 1

Polymerization of (ECH-co-THF)diol

Figure 1:
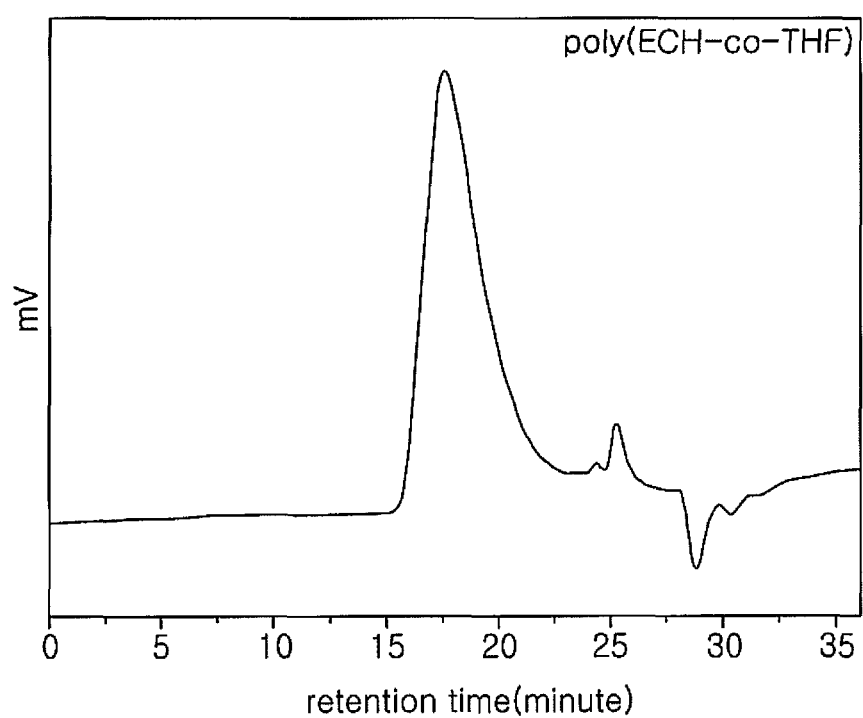
FIG. 1 is a graph of showing the GPC result of poly(ECH-co-THF)diol prepared in the preparation example.

Poly(ECH-co-THF)diol as a precursor of poly(GAP-co-THF), a binder for PBX, was polymerized by a cationic ring-opening polymerization which proceeds via the activated monomer mechanism (AMM), as shown in the following reaction scheme 2.

[Reaction scheme 2]

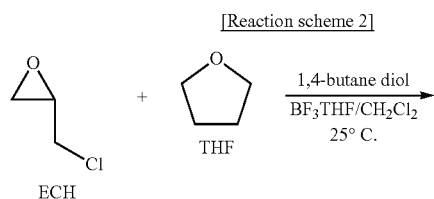

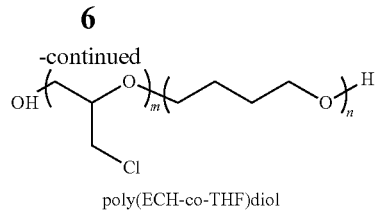
poly(ECH-co-THF)diol

A reactor connected to a water bath at constant temperature (25° C.) was connected to a cooler (0° C.), purged with a nitrogen gas for more than 1 hour and added with dichloromethylene (22 ml). Then, 1,4-butanediol (0.76 g, 8.7 mmol) as an initiator and then borontrifluoride.THF($BF_3$.THF)(0.19 g, 1.7 mmol) as a catalyst was added to the reactor for primary initiation of polymerization. To the reactor, a copolymer mixture of epichlorohydrin (12.8 g, 0.139 mol) and tetrahydrofuran (10 g, 0.139 mol) was added dropwise for 2-4 hours to carry out polymerization. After the completion of monomer addition, it was left to react for more 2 hours, and then distilled water was added and stirred for 20 minutes so as to remove the catalyst activity and thus finished the reaction. Then, it was neutralized by adding an aqueous solution of 5 wt % $NaHCO_3$. By using a separatory funnel, the resulted mixture was extracted with distilled water and dichloromethylene 3-5 times, and the dichloromethylene phase in which polymers are dissolved was separated. From the separated phase, solvent was evaporated under reduced pressure. To the obtained polymer, dibutylhydroxytoluene 0.1 wt % as an antioxidant was added, dried in a vacuum oven at 60° C. for a day and further dried in a vacuum oven at 120° C. for 1 hour to obtain poly(ECH-co-THF)diol as a transparent viscous polymer.

The structure of poly(ECH-co-THF)diol was identified by $^1H$-NMR and OH index analysis. $^1H$-NMR analysis results were as follows: $^1H$-NMR (DMSO d, ppm): 1.44~1.62 (—O—$CH_2$$\underline{CH_2CH_2}$$CH_2$— in THF), 3.30~3.37 (—O—$CH_2CH_2CH_2\underline{CH_2}$—$O\underline{CH_2}CH_2CH_2CH_2$— in THF-THF homodiad), 3.37~3.47 (—O—$CH_2CH_2CH_2$$\underline{CH_2}$—$CH_2CH(CH_2Cl)$— in THF-ECH heterodiad), 3.47~3.55 (—O—$\underline{CH_2}CH(CH_2Cl)$—$OCH_2CH_2CH_2CH_2$— in ECH-THF heterodiad), 3.55~3.67 (—O—$\underline{CH_2}CH(CH_2Cl)$—$O\underline{CH_2}CH(CH_2Cl)$— in ECH-ECH homodiad), 3.67~3.80 (—O—$CH_2CH(\underline{CH_2}Cl)$— in $CH_2$—Cl heterodiad).

It was possible to adjust the molecular weight of the synthesized poly(ECH-co-THF)diol depending on the molar ratio of [copolymer]/[initiator](1,4-butanediol) used. The ratio was represented in the following Table 1, and it was possible to obtain narrow molecular weight distribution of less than 1.50 of PDI (polydisperity)

The prepared polymer was analyzed by a gel permeation chromatography (GPC) at 45° C., at the speed of 1 ml/minute by using THF as a elution solvent. The device used was Waters 2690, and the column used was Styragel HR-1 (effective molecular weight range: 500-5,000 g/mol), HR-2 (effective molecular weight range: 500-20,000 g/mol) and HR-2 (effective molecular weight range: 500-30,000 g/mol) from Waters. A standard calibration curve was prepared by using polyethylene glycol as a standard material so as to calculate a molecular weight. For measuring the hydroxyl equivalent weight (HEW) of the prepared copolyether polymer, acetylene titration method (ASTM E 222-94) was used. By said two methods, it was possible to measure the molecular weight depending on the various [copolymer]/[initiator](mol/mol) ratios, the results. Thus measured molecular characteristics were represented in the following Table 1 and FIG. 1.

TABLE 1

| No. | [copolymer]/ [initiator] | [ECH]/ [THF] | characteristics | | | |
|---|---|---|---|---|---|---|
| | | | GPC | | OH index HEW (g/mol) | yield (%) |
| | | | Mn, obs, (g/mol) | PDI | | |
| preparation 1 | 31.9 | 52/48 | 2310 | 1.36 | 2270 | 95 |
| preparation 2 | 35.8 | 55/45 | 2290 | 1.49 | 2720 | 96 |
| preparation 3 | 38.3 | 48/52 | 3220 | 1.40 | 3180 | 95 |
| preparation 4 | 44.7 | 51/49 | 3370 | 1.39 | 3620 | 97 |
| preparation 5 | 51.1 | 40/60 | 3430 | 1.41 | 3990 | 98 |
| preparation 6 | 57.6 | 47/53 | 3710 | 1.44 | 4300 | 98 |

From the above Table 1, it is found out that poly(ECH-co-THF)diol having a narrow monodisperse represented by PDI value of 1.3 to 1.5 was obtained as represented by FIG. 1 by carrying out polymerization by the use of a polymerization initiation system $BF_3.THF/1,4$-butanediol, drying the resultant at 60° C. for one day and additionally drying under vacuum conditions at 120° C. for 1 hour, according to the present invention. On the contrary, in the conventional studies, for example a published study regarding synthesis of a GAP-THF copolymer by Y. M. Mohan and K. M. Raju, the resulted polymers from a positive ion ring-opening polymerization of ECH and THF by using a ECH $BF_3.OEt_2$/ethyleneglycol initiator system are reported to have a large PDI value as much as 2.3 or more.

Example

Synthesis of poly(GAP-co-THF)diol

An azidation reaction between poly(ECH-co-THF)diol prepared by the above preparation example 1 and $NaN_3$ was carried out as shown in the following reaction scheme 3 to substitute —Cl group with —$N_3$, thereby obtaining poly(GAP-co-THF)diol, a binder for high performance PBX.

[Reaction scheme 3]

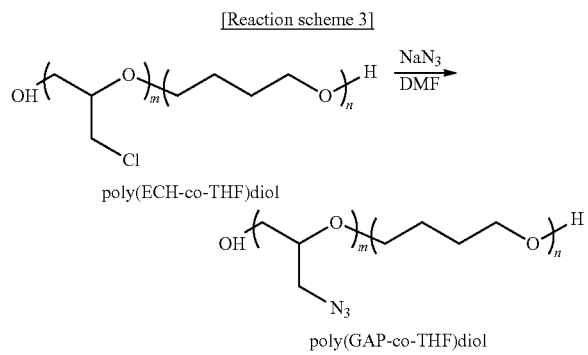

poly(ECH-co-THF)diol poly(GAP-co-THF)diol

Into a two-neck flask, 50 ml of dimethylformamide, poly(ECH-co-THF) (28 g, 0.093 mol) and sodium azide (22 g, 3.38 mol) were added and the mixture was allowed to react at 100° C. After completion of the reaction, the resultant was cooled to the room temperature, filtered and extracted 5 times or more by using a separatory funnel with distilled water and dichloromethylene. The solvent was removed under reduced pressure and the resultant was precipitated in a solvent mixture of acetone:methanol=1:2 (V/V). Thus obtained polymer was dried in a vacuum oven at 60° C. for one day, and additionally dried in a vacuum oven at 120° C. for 1 hour, obtaining a brown colored viscous polymer at a substitution rate of 99% or more.

Figure 2:
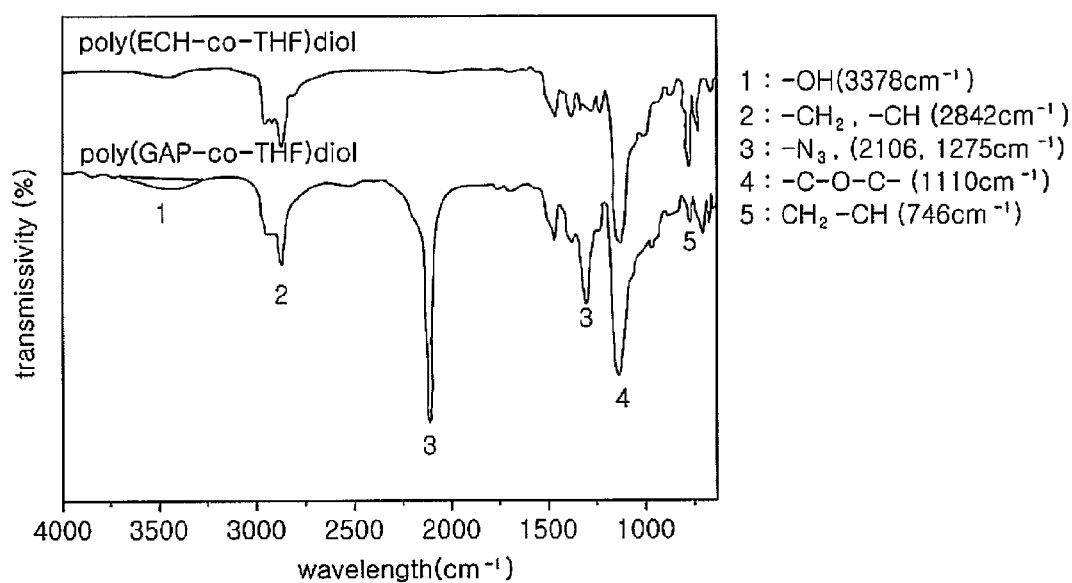
FIG. 2 is a structure analysis by FT-IR of GAP-THF polymers prepared in the example of the present invention. It is found that in the obtained poly(GAP-co-THF), chloromethyl group (5) present in poly(ECH-co-THF) near 747 $cm^{-1}$ is disappeared owing to the azidation reaction.

The structure of GAP-THF polyol was analyzed by FT-IR, and the result was represented in FIG. 2. Referring to FIG. 2, it is found that the amount of chloromethyl groups represented by peaks at near 747 $cm^{-1}$ which disappears after 12 hours becomes nearly constant. Further, as cyclic oligomers generated during the synthetic reaction does not participate in $S_N2$ reaction owing to stereochemistry of the substrate, it is found that small peaks remain near 747 $cm^{-1}$. Therefore, by dissolving the above obtained polymers in acetone and precipitating it in acetone/methanol as a secondary purification step, impurities were removed, and it can be confirmed from clear disappearance of peaks at 747 $cm^{-1}$ in the FT-IR results of poly(GAP-co-THF)diol represented by FIG. 2.

Figure 3:
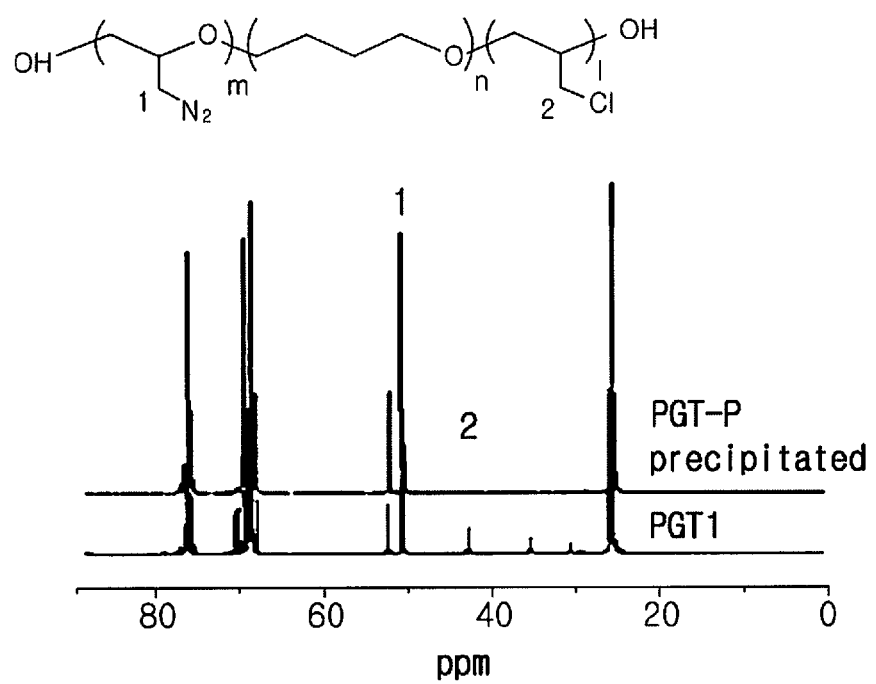
FIG. 3 shows changes in $^{13}C$-NMR data regarding the chloromethyl group after the purification of poly(GAP-co-THF)diol prepared by the example of the present invention. After purifying step, the chloromethyl peak at 43 ppm has been shifted to the azide peak at 54 ppm.

In the meantime, from the H-NMR analysis results as shown in FIG. 3, although the precise integral ratio was not known due to the overlap of H peaks from the azidomethyl group and the chloromethyl group, it was clearly found out that the chloromethyl at 43 ppm was shifted to the azide peak at 54 ppm in the $^{13}C$-NMR analysis.

Figure 4:
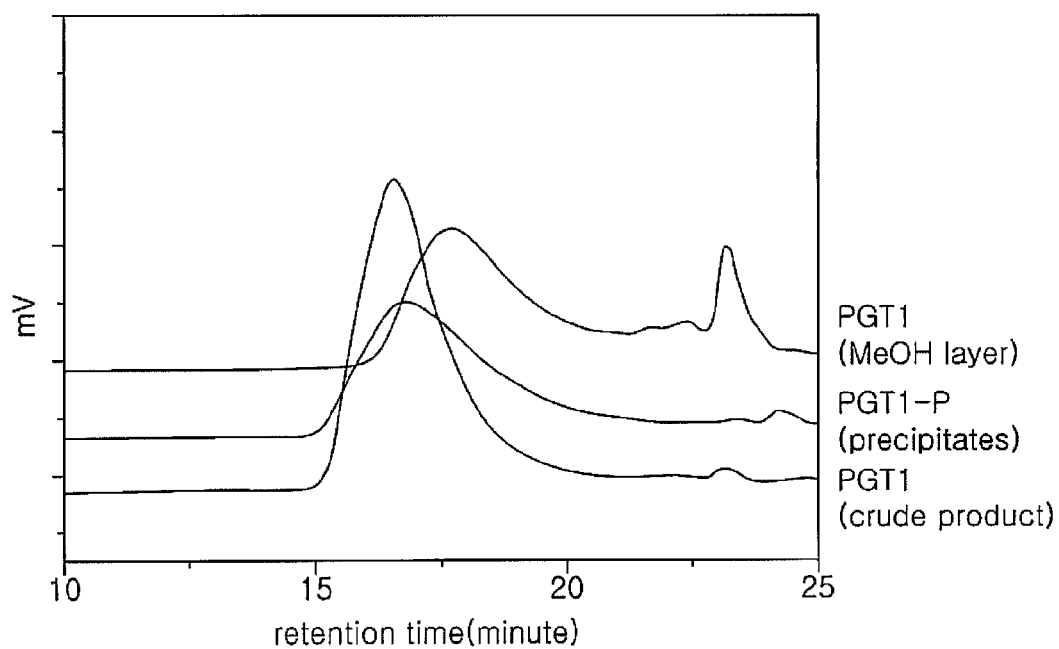
FIG. 4 is a graph of showing the GPC result of poly(GAP-co-THF)diol after the purifying step prepared in the example of the present invention. It is found that side products having a low molecular weight were removed, and poly(GAP-co-THF)diol having a molecular weight distribution of PDI=1.5 or less is found.

Additionally, from the GPC curve as represented in FIG. 4, it was confirmed that side products having a low molecular weight via the reprecipitation process were removed and poly(GAP-THF)diol having a molecular weight distribution represented by PDI of 1.5 or less was obtained.

Figure 5:
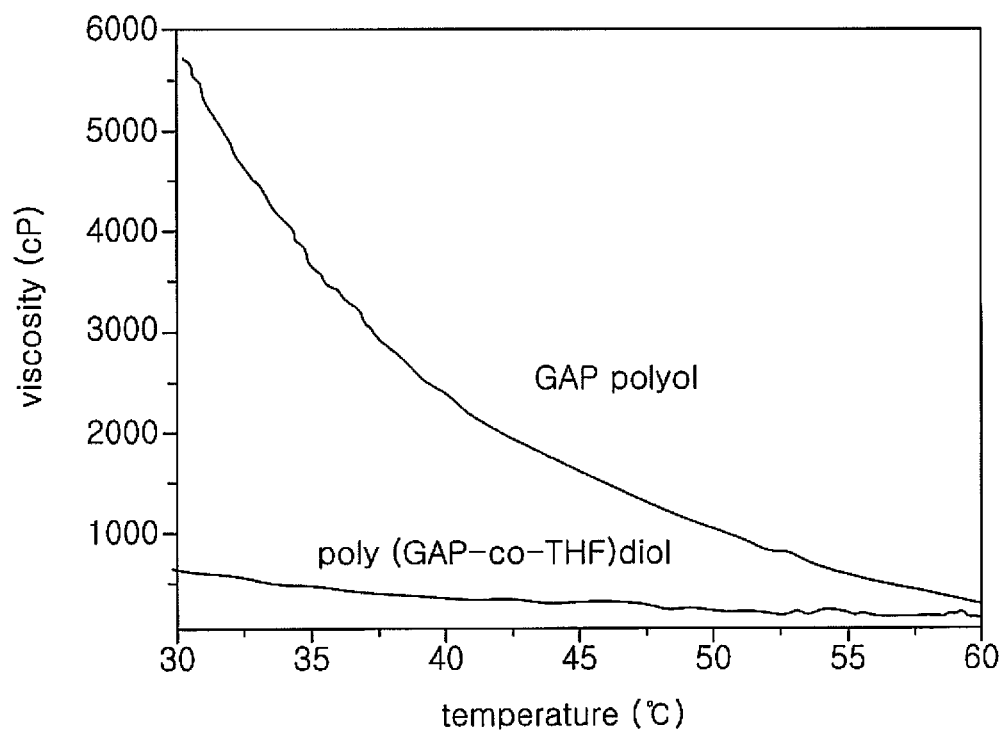
FIG. 5 is a graph comparing the viscosity of GAP polyol and poly(GAP-co-THF) having the composition of [GAP]/[THF]=1/1 prepared by the example of the present invention, respectively.

The viscosity properties of the synthesized poly(GAP-co-THF)diol were represented in FIG. 5. Poly(GAP-co-THF)diol had a lower viscosity and temperature dependency of the viscosity, compared to a conventional GPA polyol commercially available from 3M and low. Said GPA polyol from 3M showed a viscosity of 6,105 cP at 30° C. and 1,051 cP at 60° C., whereas poly(GAP-co-THF) in which THF was used as a unit for a copolymer showed a viscosity of 629 cP at 30° C. and 134 cP at 60° C., showing that the temperature dependency of the viscosity is low. Owing to such low temperature dependency, it is possible to cast polyurethane at various temperature, and low viscosity makes possible to solve the processability problems caused by high viscosity in a PBX casting process.

Test Examples

The preparation of polyurethane through a hardening reaction between a prepolymer and an isocyanate curing agent is represented in the following reaction scheme 4. Each polyurethane was prepared by an isocyanate curing agent, IPDI/N-100(=1/1 mol/mol) with a prepolymer prepared according to the present invention, poly(GAP-co-THF)diol (test example 1 and 2) and a prepolymer prepared by the conventional methods, poly(EO-co-THF)diol (prepared by using $BF_3.OEt_2$ as a catalyst, comparative test example 1), poly(ECH-co-THF)diol (comparative test examples 2 and 3) and GAP-diol (manufactured by 3M, comparative test example 4), respectively. The mechanical properties such as elasticity, elongation and toughness of thus prepared polyurethane were measured and compared. The molecular characteristics of the prepolymers used in each test example and comparative test example were represented in the following Table 2.

TABLE 2

| Prepolymer | Copolymer Composition | MW characteristic | | | OH index |
|---|---|---|---|---|---|
| | | Mn, GPC g/mol | Mn, HEW g/fn | PDI | |
| Test example 1 | Poly(GAP-co-THF)diol | 55/45 (GAP/THF) | 2420 | 2670 | 1.46 | 0.749 |
| Test example 2 | Poly(GAP-co-THF)diol | 52/48 (GAP/THF) | 2920 | 3050 | 1.49 | 0.661 |
| Comparative test example 1 | Poly(EO-co-THF)diol | — | 3250 | 3300 | 1.39 | 0.607 |
| Comparative test example 2 | Poly(ECH-co-THF)diol | 55/45 (ECH/THF) | 2290 | 2720 | 1.43 | 0.737 |
| Comparative test example 3 | Poly(ECH-co-THF)diol | 52/48 (ECH/THF) | 2830 | 3140 | 1.47 | 0.634 |
| Comparative test example 4 | GAP-diol | — | 1780 | 2460 | 1.20 | 0.813 |

[Reaction scheme 4]

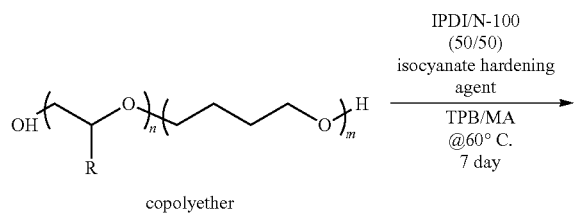

copolyether

IPDI/N-100
(50/50)
isocyanate hardening agent
→
TPB/MA
@60° C.
7 day

-continued

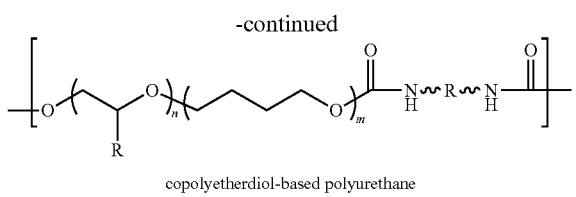

copolyetherdiol-based polyurethane

Specifically, poly(GAP-co-THF)diol (13.1 g, 4.9 mmol) or poly(ECH-co-THF)diol (13.3 g, 4.9 mmol) was placed in a reactor and dried in a vacuum oven at 60° C. until foams are disappeared. Next, Isophorone diisocyante (IPDI) (0.57 g, 5.1 mmol), Biuret triisocyanate desmodur (N-100) (1.05 g, 5.1 mmol) were added thereto and blended for 10 minutes, and then a catalyst for a urethane formation reaction, triphenyl bismuth (TPB) (0.045 g, 0.35 wt %) and maleic acid anhydride (0.045 g, 0.35 wt %) was further added and blended. The resulted mixture was filled in a mould and cured at 60° C.

In order to measure the elasticity, elongation and toughness of the finally obtained polyurethane, by using a universal testing machine Model. No. 2962 from LLOYD Instruments, a tensile strength test was carried out. Dumbbell-shaped specimens were fabricated from the polyurethane hardened in a mould and their mechanical properties were measured, at the speed of 35 mm/minute. For minimizing the errors, 5 specimens per sample were measured and the average value was represented in the following table 3.

TABLE 3

| Prepolymer | | Curing time | [NCO]/[OH] | Mechanical properties | | | Shore A hardness |
|---|---|---|---|---|---|---|---|
| | | | | $E_0$(bar) | $\sigma_m$(bar) | $\epsilon$(%) | |
| Test example 1 | Poly(GAP-co-THF)diol | 8 | 1.02 | 7.9(±0.3) | 6.0(±0.3) | 123(±3) | 46 |
| Test example 2 | Poly(GAP-co-THF)diol | 8 | 1.02 | 7.5(±0.4) | 5.7(±0.2) | 165(±4) | 45 |
| Comparative test example 1 | Poly(EO-co-THF)diol | 24 | 1.02 | 9.2(±1.0) | 5.5(±0.2) | 113(±3) | — |
| Comparative test example 2 | Poly(ECH-co-THF)diol | 8 | 1.02 | 4.1(±0.7) | 7.0(±0.2) | 489(±9) | 35 |
| Comparative test example 3 | Poly(ECH-co-THF)diol | 8 | 1.02 | 3.8(±0.8) | 6.5(±0.3) | 521(±7) | 34 |
| Comparative test example 4 | GAP-diol | 8 | 1.02 | 4.3(±0.3) | 3.8(±0.2) | 79(±2) | 48 |

In the above Table 3, Eo refers to elastic modulus; $\sigma_m$ refers to breaking stress; $\epsilon$ refers to elongation.

As shown in the above Table 3, it is found that polyurethane of the test examples 1 and 2 in which poly(GAP-co-THF)diol of the present invention was used, showed superior physical properties to that of polyurethane of the comparative test examples.

Specifically, the comparative test example 4 having a polethyleneoxide (PEO) type backbone chain with side chains having azido groups attached thereto led a polyurethane having significantly low elasticity and elongation, whereas polyurethane prepared from poly(GAP-co-THF)diol having a copolymerized THF showed a great increase in elasticity and elongation at the same time and thus toughness. It can be further found out that the comparative test examples 1 to 3 using the prepolymers in which EO or ECH was copolymerized with THF showed inferior hardness to that of the test examples according to the present invention.

What is claimed is:

1. A method for preparing poly(glycidylazido polymer-co-tetrahydrofuran)diol comprising:
   i) polymerizing poly(ECH-co-THF)diol via cationic ring-opening polymerization between epichlorohydrin (ECH) and THF by using BF3.THF as a catalyst at the presence of an initiator which is at least one selected from the group consisting of 1,2-ethyleneglycol, 1,3-propanediol, 1,4-butanediol and 1,5-pentanediol; and
   ii) synthesizing poly(glycidylazido polymer-co-tetrahydrofuran)diol by substituting Cl on the side chains of the poly(ECH-co-THF)diol polymerized from the above step i) with —$N_3$.

2. The method for preparing poly(glycidylazido polymer-co-tetrahydrofuran)diol according to claim 1, further comprising:
   iii) purifying the product from the step ii) via reprecipitation using a mixed solvent of acetone and methanol, after the step ii) synthesizing poly(glycidylazido polymer-co-tetrahydrofuran)diol.

* * * * *